(12) United States Patent
Hirano et al.

(10) Patent No.: US 7,466,513 B2
(45) Date of Patent: Dec. 16, 2008

(54) AIRFLOW SHROUD FOR HDD TRACKING MICROACTUATOR

(75) Inventors: Toshiki Hirano, San Jose, CA (US); Henry Hung Yang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 532 days.

(21) Appl. No.: 10/643,265

(22) Filed: Aug. 19, 2003

(65) Prior Publication Data

US 2005/0041328 A1     Feb. 24, 2005

(51) Int. Cl.
G11B 33/14    (2006.01)
G11B 5/56     (2006.01)
G11B 21/24    (2006.01)

(52) U.S. Cl. .................. 360/97.02; 360/294.1
(58) Field of Classification Search .............. 360/97.02, 360/97.03, 294.1–294.6
See application file for complete search history.

(56) References Cited

U.S. PATENT DOCUMENTS

| | | | | |
|---|---|---|---|---|
| 4,473,855 A * | 9/1984 | Plotto et al. | ............... | 360/244.2 |
| 4,651,243 A * | 3/1987 | Daste et al. | ............... | 360/246.1 |
| 4,769,727 A * | 9/1988 | Mao | ........................ | 360/236.3 |
| 4,879,618 A * | 11/1989 | Iida et al. | .................. | 360/264.1 |
| 5,270,888 A * | 12/1993 | Collisson et al. | ......... | 360/235.1 |
| 5,390,059 A * | 2/1995 | Tokuyama et al. | ....... | 360/246.6 |
| 5,635,082 A * | 6/1997 | Yamamoto et al. | ............. | 216/22 |
| 5,920,978 A * | 7/1999 | Koshikawa et al. | ....... | 29/603.12 |
| 6,078,473 A | 6/2000 | Crane et al. | | |
| 6,396,667 B1 * | 5/2002 | Zhang et al. | ............. | 360/294.3 |
| 6,476,538 B2 | 11/2002 | Takeuchi et al. | | |
| 6,549,365 B1 * | 4/2003 | Severson | .................. | 360/97.02 |
| 6,611,399 B1 * | 8/2003 | Mei et al. | .................. | 360/234.7 |
| 6,710,977 B2 * | 3/2004 | Tadepalli et al. | ......... | 360/244.2 |
| 6,804,087 B2 * | 10/2004 | Wobbe et al. | ................ | 360/245 |
| 6,879,468 B2 * | 4/2005 | Nakamura et al. | ........ | 360/294.1 |
| 6,930,860 B1 * | 8/2005 | Coffey | ..................... | 360/294.4 |
| 7,119,991 B2 * | 10/2006 | Yao et al. | .................. | 360/236.3 |

(Continued)

FOREIGN PATENT DOCUMENTS

JP         58070459 A  *  4/1983

(Continued)

OTHER PUBLICATIONS

English-language translation of Ikoh, Japanese Document No. 01-158605, orginal publication date Jun. 21, 1989.*

(Continued)

*Primary Examiner*—William J Klimowicz (57) ABSTRACT

An airflow shroud for either a moving-slider-type or a moving-head-type microactuator of a disk drive reduces off-track motion of a read/write element for either a moving-slider-type microactuator or a moving-head-type microactuator. One configuration of the airflow shroud includes a frame portion and an attachment portion. The frame portion has an opening suitable for exposing an air bearing surface of a slider for a disk drive and surrounds the slider and a moving-slider-type microactuator coupled to the slider. The attachment portion is adapted for attachment to a suspension of a disk drive. Another configuration includes a plate portion and a recessed portion. The plate portion is attachable to a slider having a moving-head-type microactuator. The recessed portion corresponds to the moving-head-type microactuator of the slider.

3 Claims, 7 Drawing Sheets

U.S. PATENT DOCUMENTS

2002/0008943 A1  1/2002  Hipwell, Jr., et al.

FOREIGN PATENT DOCUMENTS

| | | | | |
|---|---|---|---|---|
| JP | 58077056 | A | * | 5/1983 |
| JP | 59060762 | A | * | 4/1984 |
| JP | 59215072 | A | * | 12/1984 |
| JP | 01158605 | A | * | 6/1989 |
| JP | 03069005 | A | * | 3/1991 |
| JP | 03095717 | A | * | 4/1991 |
| JP | 05325139 | A | * | 12/1993 |
| JP | 10144026 | A | * | 5/1998 |
| JP | 2000348321 | A | * | 12/2000 |
| JP | 2001143415 | A | * | 5/2001 |
| JP | 2003091953 | A | * | 3/2003 |
| WO | WO 02097803 | A1 | * | 12/2002 |

OTHER PUBLICATIONS

English language translation of JP 01158605 A, (T. Ikoh), published Jun. 21, 1989, "Magnetic Head Assembly."*

English language translation of JP 03069005 A, (S. Iketa), published Mar. 25, 1991, "Floating Type Magnetic Shield Body for a Magnetic Head."*

English language translation of JP 03095717 A, (Yoshio Koshigawa et al.), published Apr. 22, 1991, "Magnetic Head."*

* cited by examiner

AIRFLOW SHROUD FOR HDD TRACKING MICROACTUATOR

BACKGROUND OF THE INVENTION

1. Field of the Invention

The present invention relates to the field of disk drives. In particular, the present invention relates to a disk drive having a read/write element having reduced off-track motion.

2. Description of the Related Art

Figure 1:
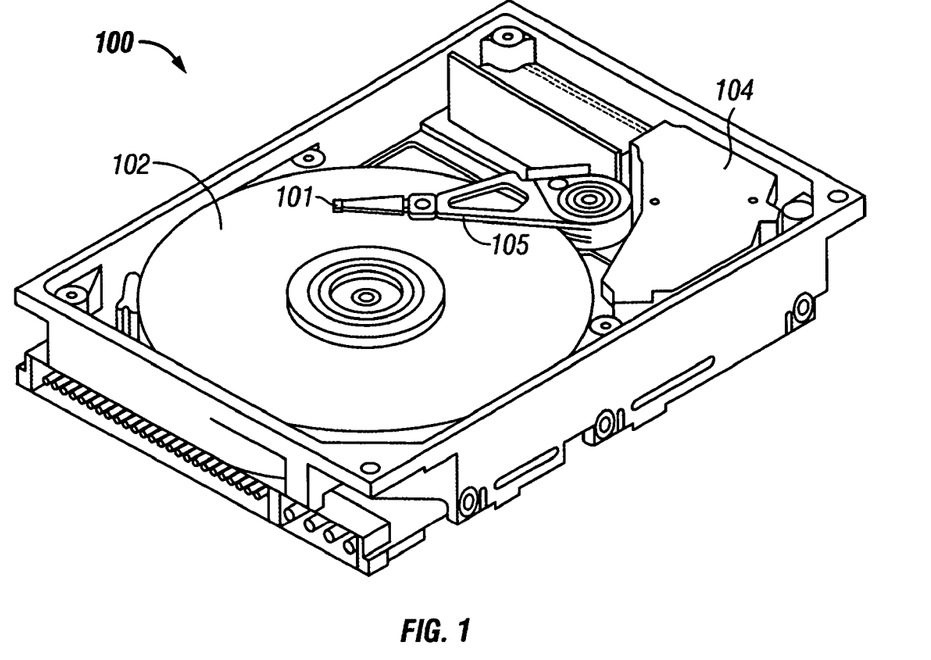
FIG. 1 shows an exemplary high-RPM disk drive having a magnetic read/write head.

FIG. 1 shows an exemplary high-RPM hard disk drive (HDD) 100 having a magnetic read/write head (or a recording slider) 101 that includes, for example, a tunnel-valve read sensor, that is positioned over a selected track on a magnetic disk 102 using, for example, a two-stage servo system for reading data stored on disk 102. The two-stage servo system includes a voice-coil motor (VCM) 104 for coarse positioning a read/write head suspension 105 and may include a microactuator, or micropositioner, for fine positioning read/write head 101 over the selected track. As used herein, a microactuator (or a micropositioner) is a small actuator that is placed between a suspension and a slider, and moves the slider relative to the suspension.

There are several types of microactuators that are conventionally used. One type is referred to as a moving-slider-type microactuator. Another type is referred to as a moving-head-type microactuator. The basic structure for both of these types of microactuators is the same and includes a structure that allows relative motion like a spring, and a mechanism that generates a driving force. One side of the microactuator is attached to a suspension load beam, which is a relatively solid structure. The other side of the microactuator is attached to a structure on which a read/write element is located, such as a slider.

Figure 2:
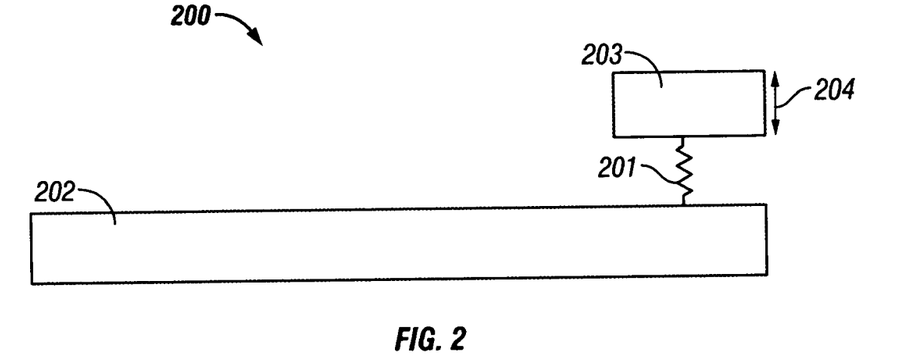
FIG. 2 depicts block diagram model for a moving-slider-type microactuator.

FIG. 2 depicts block diagram model for a moving-slider-type microactuator arrangement 200. A microactuator, which is modeled as a spring 201 in FIG. 2, is placed between a suspension 202 and a slider 203. Suspension 202 is relatively rigid in the off-track direction, while microactuator 201 is relatively flexible in the off-track direction. Consequently, slider 203 is also relatively flexible in the off-track direction, as depicted by arrow 204. Exemplary moving-slider-type microactuators are disclosed by U.S. Pat. No. 6,078,473 to Crane et al. and U.S. Pat. No. 6,476,538 to Takeuchi et al.

Figure 3:
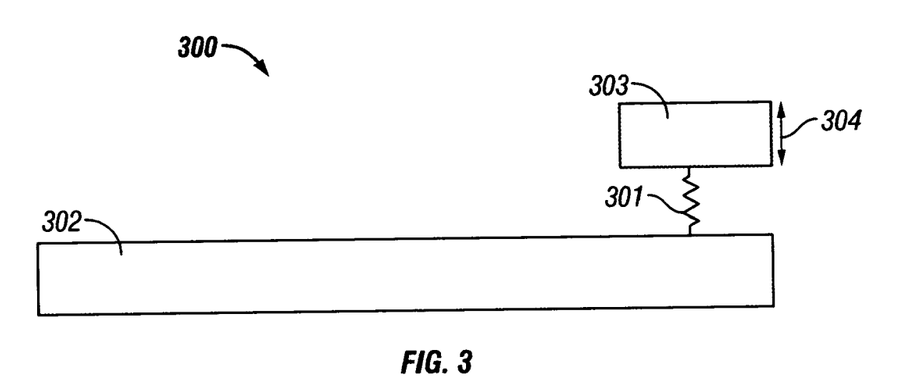
FIG. 3 depicts a block diagram model for a moving-head-type microactuator.

FIG. 3 depicts a block diagram model for a moving-head-type microactuator arrangement 300. For a moving-head-type microactuator, a microactuator 301 is placed between a slider body 302 and a read/write element 303. Similar to a moving-slider-type microactuator, slider body 302 is rigid in the off-track direction, while microactuator 301 is relatively flexible in the off-track direction so read/write element 303 is also relatively flexible in the tracking direction, as depicted by arrow 304

Accordingly, a common problem with both a moving-slider-type and a moving-head-type microactuator is an increased level of off-track positional disturbances that are caused by the combination of the flexibility of the spring mechanism of the microactuator and a force applied to the moving part (e.g., the airflow). In a typical HDD, the slider and R/W element are exposed to very fast and usually turbulent airflow that is caused by the spinning disk. For non-microactuator HDDs, the slider and R/W element are respectively fixed to the suspension and to the slider body and are rigid in an off-track direction. Thus, airflow force does not cause off-track positional disturbance problems. When, however, a microactuator is flexible in an off-track direction, such as a moving-slider-type or a moving-head type microactuator, force generated by air-flow can easily produce off-track positional disturbances.

Figure 4:
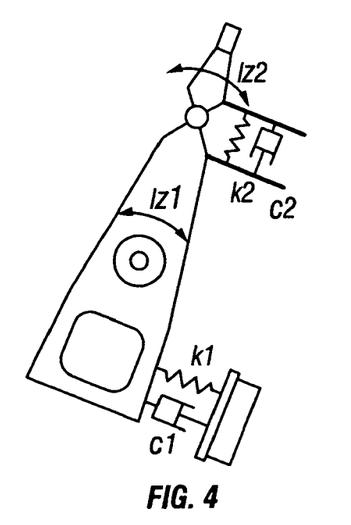
FIG. 4 depicts a more detailed block diagram model for a suspension load beam having a microactuator.

FIG. 4 depicts a more detailed block diagram model for a suspension load beam having a microactuator. As shown in FIG. 4, the spring mechanism of the VCM is modeled by a spring having a spring constant k1 and the spring mechanism of a microactuator is modeled as a spring having a spring constant k2. The damping factors for the VCM and the microactuator are respectively modeled by damping factors c1 and c2. Rotational inertias Iz1 and Iz2 represent the respective rotational inertias associated with the VCM and microactuator.

Figure 5:
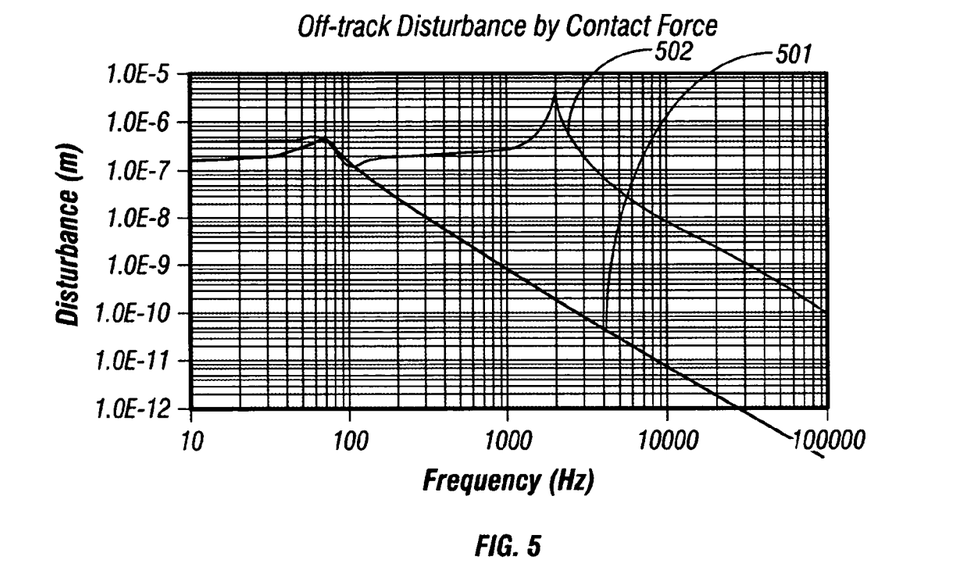
FIG. 5 shows a graph of calculated off-track positional disturbances for an exemplary conventional non-microactuator suspension load beam and for an exemplary conventional microactuator HDD using the model of FIG. 4.

FIG. 5 shows a graph of calculated off-track positional disturbances for an exemplary conventional non-microactuator suspension load beam and for an exemplary conventional microactuator HDD using the model of FIG. 4. The following parameters are assumed for the model of FIG. 4: The force input is from an air-flow that creates a torque disturbance having an amplitude of $2.5 \times 10^{-7}$ Nm that is applied to the microactuator. The inertia of the VCM is $4 \times 10^{-6}$ kg*M². The resonant frequency of VMC is 70 Hz. The quality factor of VCM main resonance is 5. The length of VMC is 50 mm. The microactuator type is a moving-slider-type microactuator, which moves the slider in rotational direction. The rotational inertia of the moving part of the microactuator including the slider is $5.7 \times 10^{-13}$ kg*m². The main resonant frequency of the microactuator is 2 kHz, and the quality factor of the microactuator is 30.

The abscissa of FIG. 5 is frequency in Hz, and the ordinate of FIG. 5 is disturbance measured in meters (m). Curve 501 is the disturbance experienced by a non-micro VCM. Curve 502 is the disturbance experienced by a microactuator and VCM combination. The graph of FIG. 5 shows two problems that are experienced by a microactuator/VCM combination. First, a microactuator/VCM combination exhibits a resonance at 2 kHz, resulting in a large disturbance peak at 2 kHz. Second, above about 100 Hz, a microactuator/VCM combination exhibits a higher level of disturbance than a non-micro VCM. Further, the level of disturbance experienced by a microactuator/VCM combination above the resonant frequency of the microactuator is almost three orders of magnitude greater that the level of disturbance experienced by a non-microactuator VCM HDD.

Figure 6:
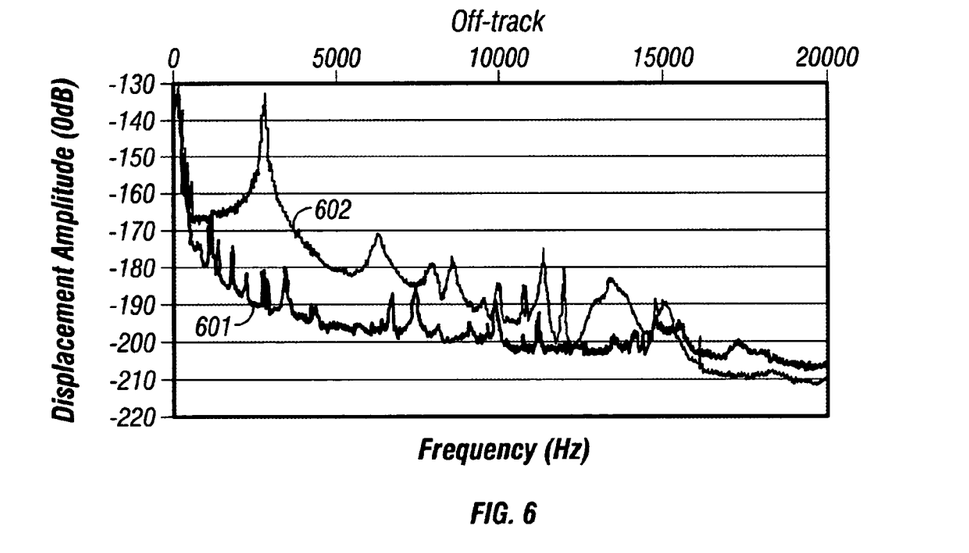
FIG. 6 is a graph showing measured positional disturbance data for a non-microactuator HDD and an HDD having a microactuator/VCM combination.

FIG. 6 is a graph showing measured positional disturbance data for a non-microactuator HDD and an HDD having a microactuator/VCM combination. The microactuator used for both the microactuator/VCM combination is a moving-slider-type microactuator that moves the slider in a rotational direction. The parameters associated with the non-microactuator HDD and the HDD having a microactuator/VCM combination of FIG. 6 roughly correspond to the parameters for the devices of FIG. 5. Curve 601 (blue) is the measured positional disturbance for a non-microactuator VCM HDD. Curve 602 (red) is the measured positional disturbance for a microactuator/VCM combination HDD. Curves 601 and 602 exhibit tendencies that are similar to the corresponding curves shown in FIG. 5.

What is needed is a technique for reducing positional disturbances experienced by a moving-slider-type microactuator and a moving-head-type microactuator.

BRIEF SUMMARY OF THE INVENTION

The present invention provides a technique for reducing positional disturbances experienced by a moving-slider-type microactuator and a moving-head-type microactuator.

The advantages of the present invention are provided by an airflow shroud for a moving-slider-type microactuator of a disk drive having a frame portion and an attachment portion. The frame portion has an opening suitable for exposing an air bearing surface of a slider for a disk drive and surrounds the slider and a moving-slider-type microactuator coupled to the slider. The attachment portion is adapted for attachment to a suspension of a disk drive. About 50 to 100 micrometers of the slider are exposed through the opening of the frame portion. One configuration of the airflow shroud includes a frame portion having side portions that form the opening and a tapered shape between each side portion and the opening.

The present invention also provides an airflow shroud for a moving-head-type microactuator of a disk drive that includes a plate portion and a recessed portion. The plate portion is attachable to a slider having a moving-head-type microactuator. The recessed portion corresponds to the moving-head-type microactuator of the slider.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides an air-flow shroud that surrounds the moving part of a moving-slider-type microactuator and of a moving-head-type microactuator. For a moving-slider-type of microactuator, the shroud of the present invention is attached to the suspension load-beam and surrounds the slider and the microactuator. For a moving-head-type microactuator, the shroud of the present invention is fixed to the slider body and surrounds the R/W element and the microactuator.

Figure 7A:
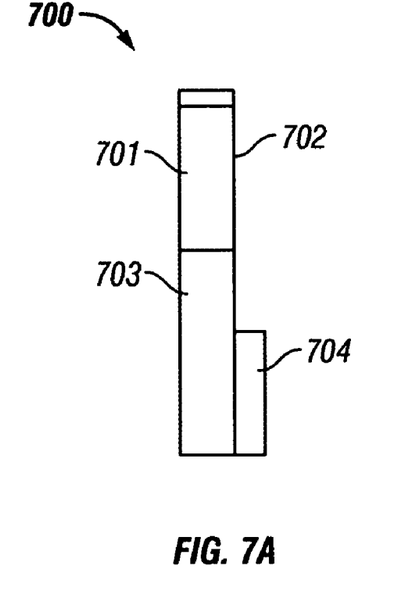
FIGS. 7A and 7B respectively show side and bottom views of a first embodiment of a shroud for a moving-slider-type microactuator according to the present invention.
Figure 7B:
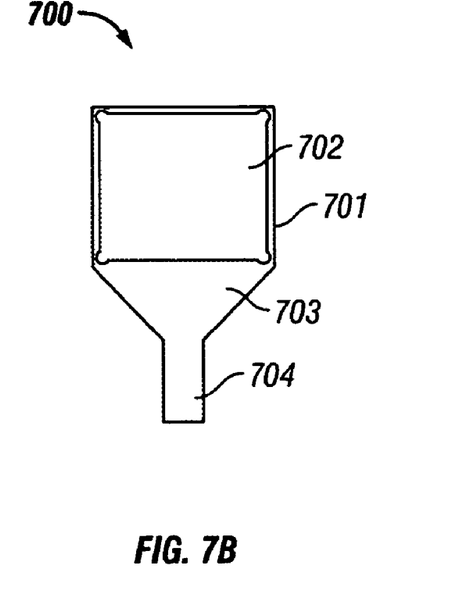

FIGS. 7A and 7B respectively show side and bottom views of a first embodiment of a shroud 700 for a moving-slider-type microactuator according to the present invention. Shroud 700 includes a frame structure 701 that forms an opening 702. Shroud 700 also includes a tapered portion 703 and an attachment portion 704. Shroud 700 can be made from either a metal or a plastic material.

Figure 8A:
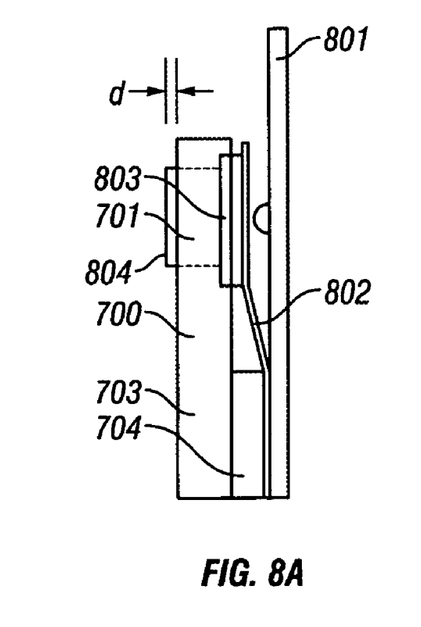
FIGS. 8A and 8B respectively show side and bottom view of the first embodiment of a shroud for a moving-slider-type microactuator attached to a suspension load beam according to the present invention.
Figure 8B:
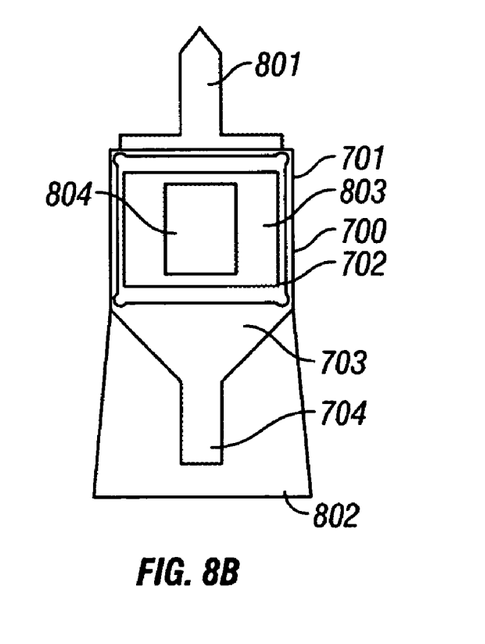

FIGS. 8A and 8B respectively show side and bottom views of the first embodiment of a shroud 700 for a moving-slider-type microactuator attached to a suspension load beam 801 according to the present invention. Attachment portion 704 is attached to suspension load beam 801 using an adhesive. A microactuator 803 is attached to flexure 802 and a slider 804 is attached to microactuator 803. Shroud 700 covers slider 804 so that only about 50-100 μm of slider 804 is exposed as it extends out of opening 702, as indicated by d. Consequently, essentially only the Air Bearing Surface (ABS) of slider 804 is exposed to turbulent airflow, thereby minimizing off-track positional disturbances caused by air flow turbulence.

Figure 9A:
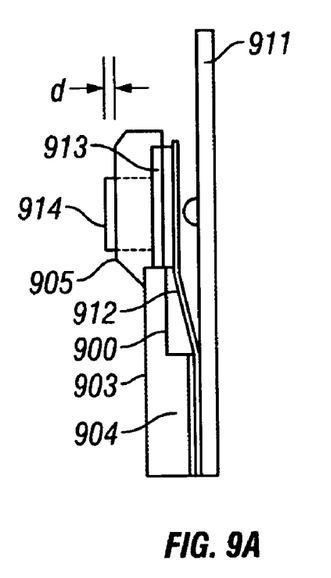
FIGS. 9A and 9B respectively show side and bottom views of a second embodiment of a shroud for a moving-slider-type microactuator according to the present invention.
Figure 9B:
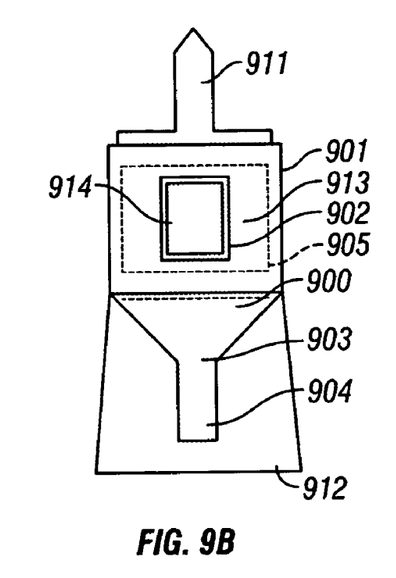

FIGS. 9A and 9B respectively show side and bottom views of a second embodiment of a shroud 900 for a moving-slider-type microactuator according to the present invention attached to a suspension load beam 911 according to the present invention. Shroud 900 includes a frame structure 901 that forms an opening 902. Shroud 900 also includes a tapered portion 903 and an attachment portion 904. Shroud 900 includes an additional tapered portion 905 that surrounds opening 902, thereby making shroud 900 more aerodynamic than shroud 700. Attachment portion 904 of shroud 900 is made from either a metal or a plastic material and is attached to suspension load beam 911 using an adhesive in a well-known manner. A microactuator 913 is attached to flexure 912 and a slider 914 is attached to microactuator 913. Shroud 900 covers slider 914 so that only about 50-100 μm of slider 914 is exposed as it extends out of opening 902 as indicated by d. As with shroud 700, essentially only the Air Bearing Surface (ABS) of slider 914 is exposed to turbulent airflow, thereby minimizing off-track positional disturbances caused by air flow turbulence.

Figure 10A:
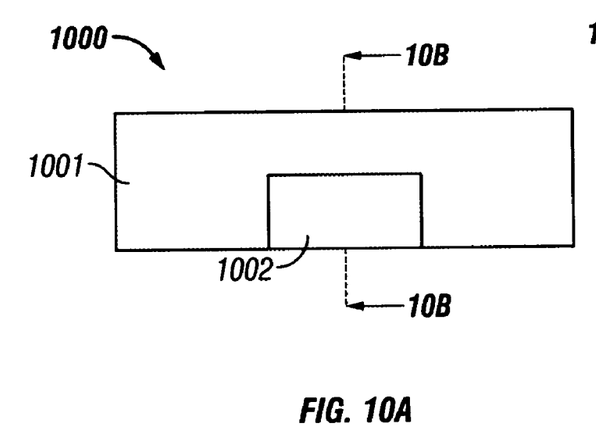
FIG. 10A shows a mounting-surface view of a shroud for a moving-head-type microactuator according to the present invention.
Figure 10B:
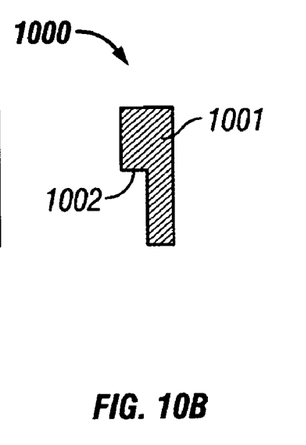
FIG. 10B shows a cross-sectional view of shroud taken at line A-A, shown in FIG. 10A.
Figure 11:
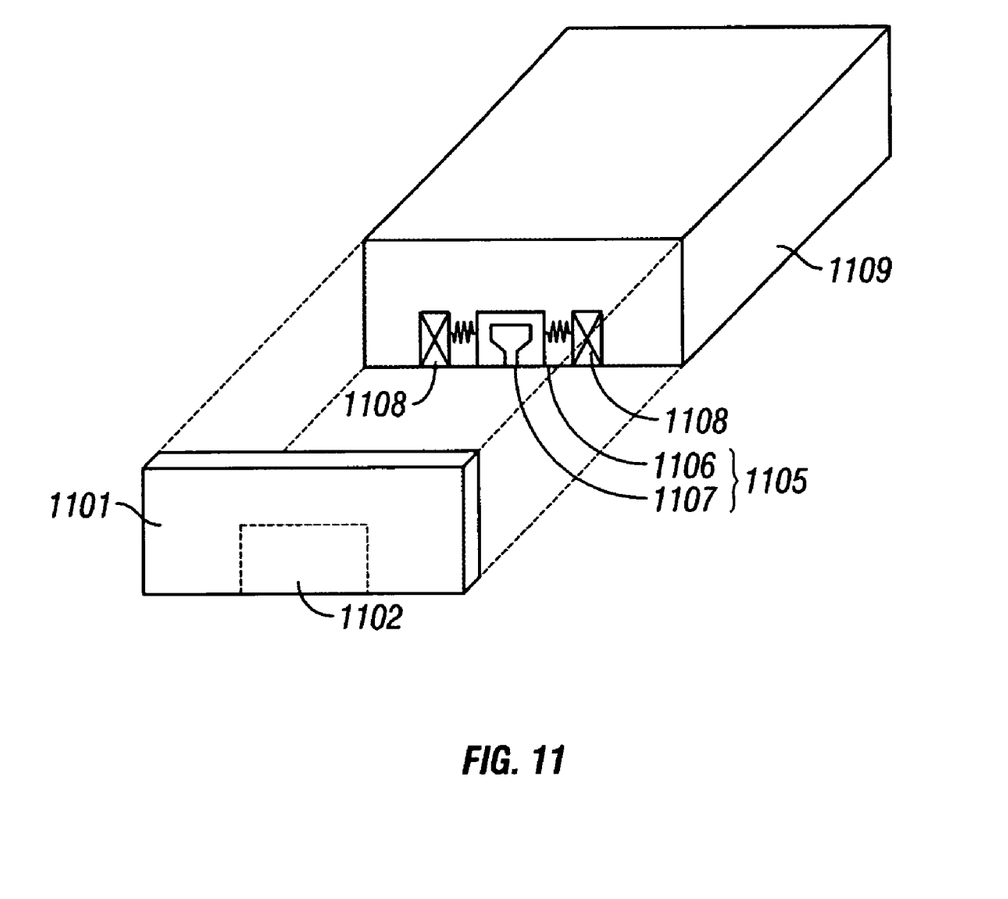
FIG. 11 shows an exploded view of a shroud for a moving-head-type microactuator according to the present invention and a moving-head-type microactuator.

FIG. 10A shows a mounting-surface view of a shroud 1000 for a moving-head-type microactuator according to the present invention. FIG. 10B shows a cross-sectional view of shroud 1000 taken at line A-A, shown in FIG. 10A. Shroud 1000 includes a plate portion 1001 having a recessed portion 1002. FIG. 11 shows an exploded view of a shroud 1101 for a moving-head-type microactuator according to the present invention and a moving-head-type-microactuator 1105. Moving-head-type actuator 1105 includes a microactuator 1106 and a read/write head 1107. Anchor structures 1108 are fixed on the body of slider 1109. The spring structures of microactuator 1106 are attached to anchor structures 1108 and allow R/W head 1107 to move laterally. Recessed portion 1102 of shroud 1100 corresponds to the positioning of microactuator 1106 and read/write head 1107 on moving-head-type actuator 1105. Shroud 1000 is attached to slider 1109 using an adhesive in a well-known manner. The bottom surface of shroud 1000 is recessed from the bottom of slider 1109 so that shroud 1000 does not interfere with the functionality of the air-bearing surface of slider 1109.

Figure 12:
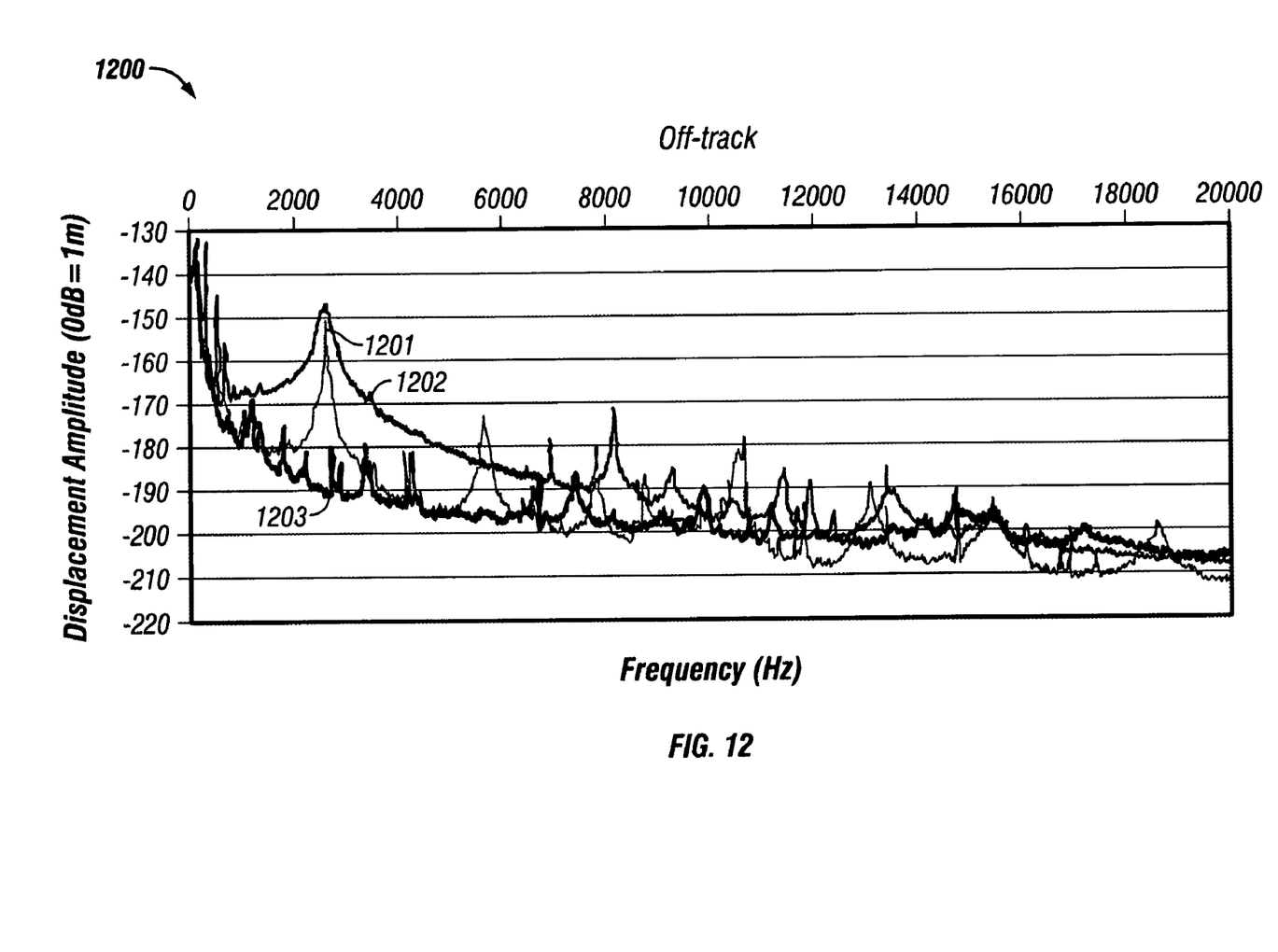
FIG. 12 shows a graph of measured off-track motion for a moving-slider-type microactuator having a shroud according to the present invention in comparison to measured off-track motion for a moving-slider-type microactuator without a shroud and for a non-microactuator HDD.

FIG. 12 shows a graph 1200 of measured off-track motion for a moving-slider-type microactuator having a shroud according to the present invention in comparison to measured off-track motion for a moving-slider-type microactuator without a shroud and for a non-microactuator HDD. The abscissa of graph 1200 is the frequency of the off-track motion measured in Hz. The ordinate of graph 1200 is the displacement amplitude of the head measured in dB, with 0 dB being equal to 1 m. The HDD for each microactuator arrangement or non-microactuator arrangement was a 10,000 RPM disk drive. Curve 1201 is the measured off-track motion for a moving-head-type microactuator having a shroud according to the present invention. Curve 1202 is the measured off-track motion for a moving-head-type microactuator without a shroud. Curve 1203 is the measured off-track motion for a non-microactuator HDD. As shown by FIG. 12, a shroud for a moving-head-type microactuator according to the present invention reduces the off-track motion of a moving-head-type microactuator by about 10-20 dB.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A disk drive including an airflow shroud for a moving-slider-type microactuator, comprising:
    a first end of a flexure directly coupled with a suspension load beam;
    a second end of said flexure directly coupled with a slider-type microactuator;
    a slider directly coupled with said slider-type microactuator; and
    an airflow shroud coupled with said flexure and with said suspension load beam such that said flexure is disposed between said airflow shroud and said suspension load beam, said shroud comprising:
    a frame portion forming an opening for exposing a protruding portion of said slider, the frame portion surrounding said moving-slider-type microactuator coupled to the slider, said frame portion not contacting said suspension load beam said frame portion including a portion substantially covering a leading end of said slider; and
    an attachment portion adapted for attachment with said suspension load beam wherein said frame portion is configured to not surround said suspension load beam.

2. The disk drive according to claim 1, wherein the frame portion has side portions forming the opening and a tapered shape between each side portion and the opening.

3. The disk drive according to claim 1, wherein between about 50 to 100 micrometers of the slider protrude through the opening of the frame portion.

* * * * *